United States Patent [19]

Matuschek

[11] Patent Number: 4,518,295
[45] Date of Patent: May 21, 1985

[54] MULTI-PART FASTENING NUT, INCLUDING JAM NUT

[75] Inventor: Josip Matuschek, Newport Beach, Calif.

[73] Assignee: Textron Inc., Santa Ana, Calif.

[21] Appl. No.: 506,050

[22] Filed: Jun. 20, 1983

[51] Int. Cl.³ .......................................... F16B 39/28
[52] U.S. Cl. ............................................ 411/291; 411/3
[58] Field of Search .................. 411/2, 1, 3, 4, 5, 6, 411/7, 8, 62, 276, 285, 286, 288, 290, 291, 427

[56] References Cited

U.S. PATENT DOCUMENTS

| | | | |
|---|---|---|---|
| 735,992 | 8/1903 | Martin | 411/290 |
| 1,380,395 | 6/1921 | Korach | 411/3 |
| 1,449,683 | 3/1923 | Lippold | 411/276 |
| 2,007,293 | 7/1935 | Cayouette | 411/285 |
| 2,304,310 | 12/1942 | Luce | 411/288 |
| 3,385,339 | 5/1968 | Dahl | 411/288 |
| 3,449,998 | 6/1969 | Wing | 411/5 |
| 3,512,447 | 5/1970 | Vaughn | 411/5 |
| 4,479,666 | 10/1984 | Welsh et al. | 411/10 X |

FOREIGN PATENT DOCUMENTS

| | | | |
|---|---|---|---|
| 235716 | 6/1911 | Fed. Rep. of Germany | 411/291 |
| 1023639 | 1/1958 | Fed. Rep. of Germany | 411/3 |
| 401449 | 1/1943 | Italy | 411/291 |
| 58342 | 10/1946 | Netherlands | 411/291 |
| 1269611 | 4/1972 | United Kingdom | 411/3 |
| 2077384 | 12/1981 | United Kingdom | 411/2 |
| 720218 | 3/1980 | U.S.S.R. | 411/5 |

Primary Examiner—Gary L. Smith
Assistant Examiner—Adrian H. Whitcomb, Jr.
Attorney, Agent, or Firm—Harvey C. Nienow

[57] ABSTRACT

A fastening nut, which by virtue of precisely located laser cuts and the application of predetermined torque to a grip member, is enabled to break into several parts, one of which can be used as a jam nut. The nut is provided with an internally threaded sleeve, a grip member and interconnecting means, the latter of which may be provided with one or more shear areas by virtue of a series of laser cuts. At a predetermined torque on the grip member, the sleeve is sheared from the interconnecting means and grip member and, as a second embodiment, the interconnecting means may be provided with internal fastening threads so that further torquing of the grip member drives such interconnecting means into the sleeve and thereafter a second shear separation is effected to remove the grip member from the jam nut.

12 Claims, 10 Drawing Figures

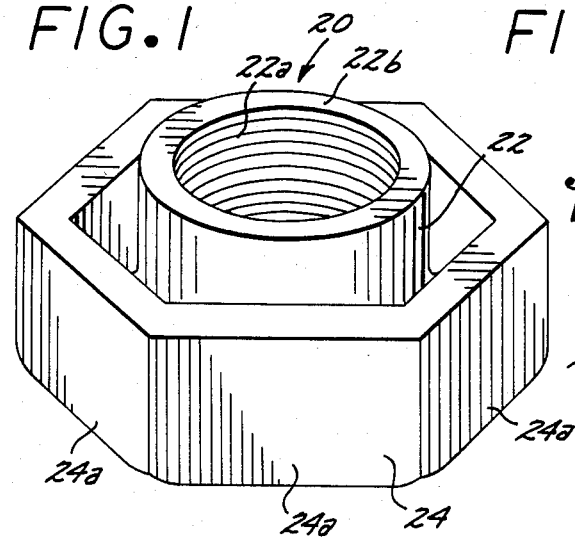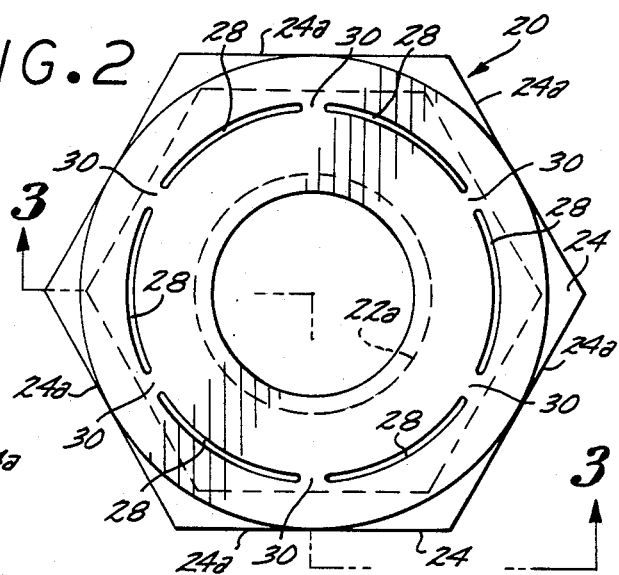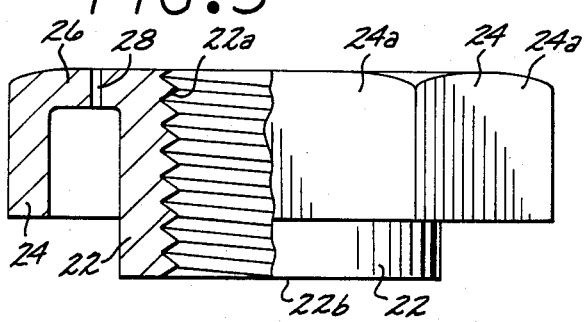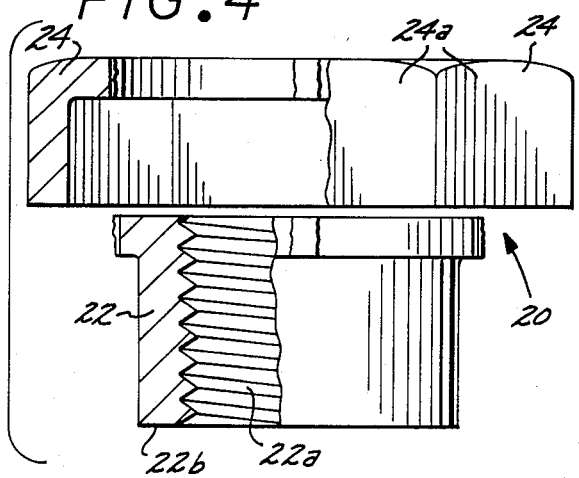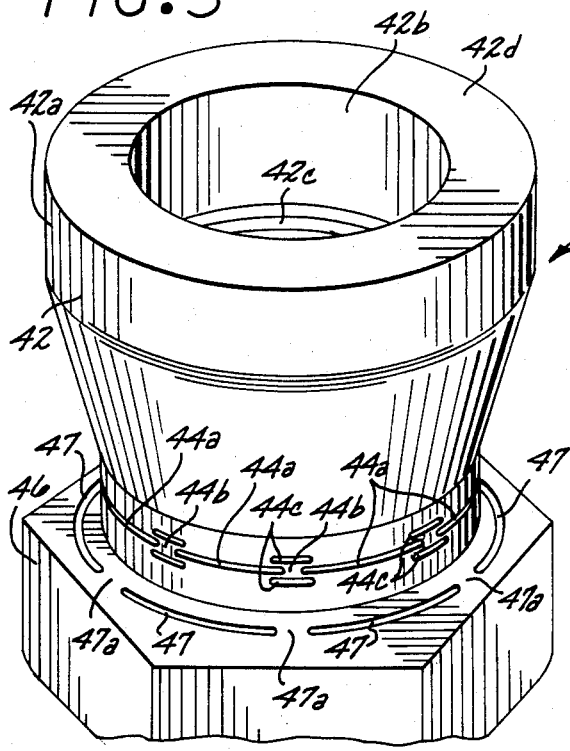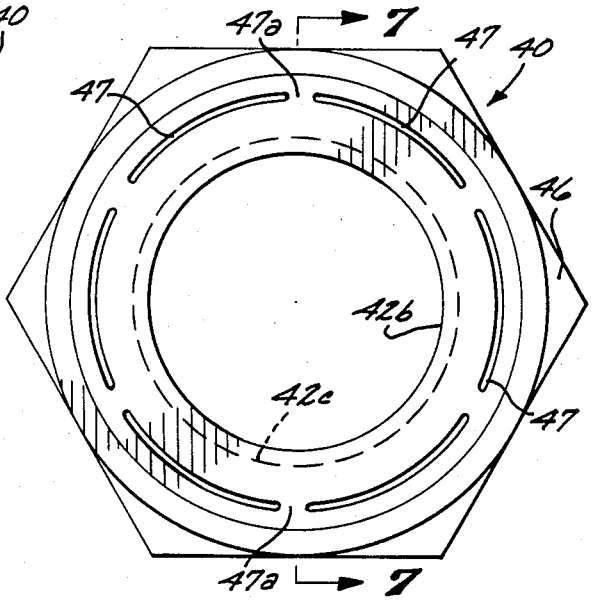

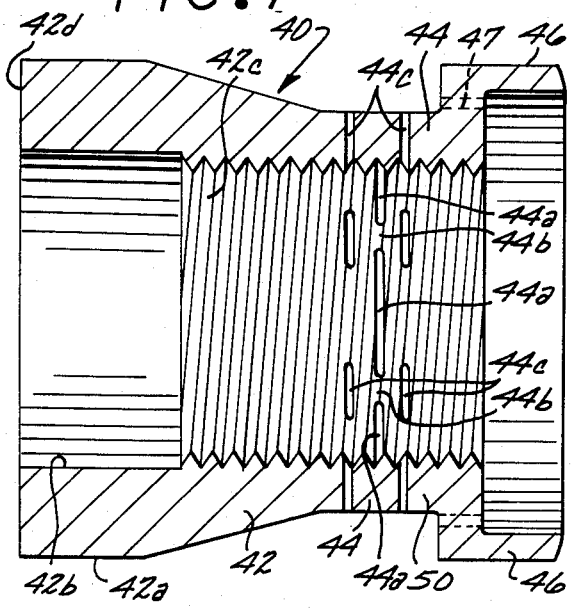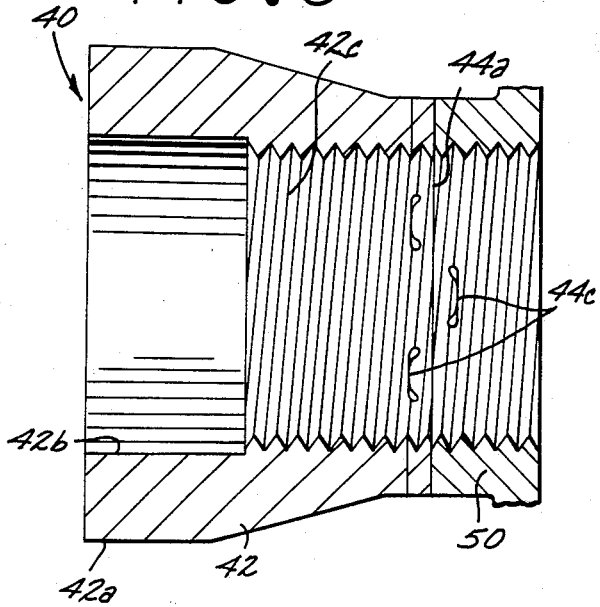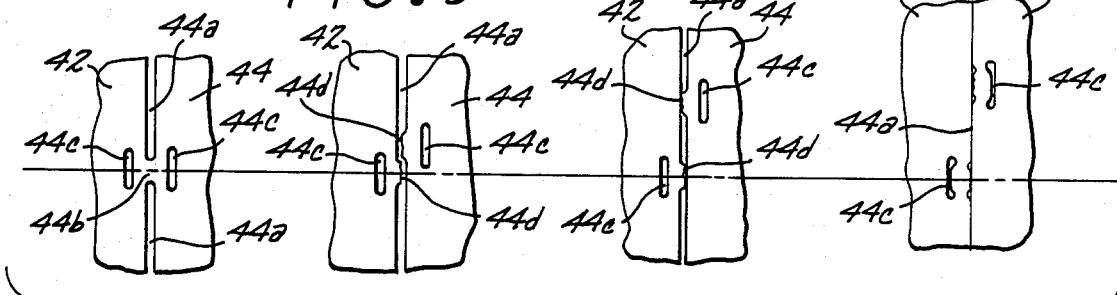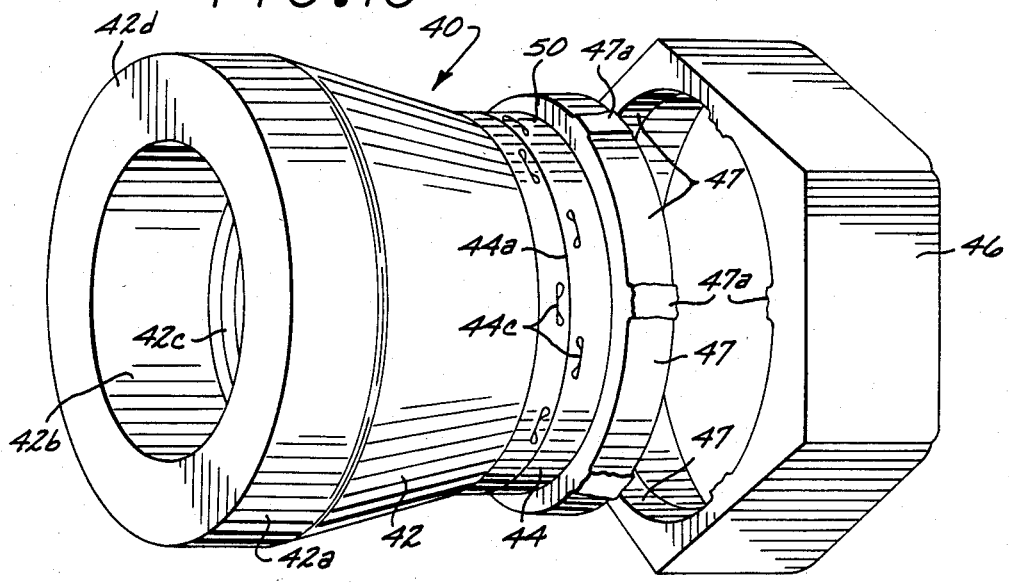

MULTI-PART FASTENING NUT, INCLUDING JAM NUT

The present invention relates generally to fastening nuts, and more particularly to fastening nuts which are of minimum weight.

Particularly in the manufacture of aircraft where many thousands of fastening devices are used on each aircraft, weight is of considerable importance. As such, it is desirable for a fastening nut to be little more than a cylindrical sleeve which cooperates with the threaded shank or body of a bolt and which has no additional weight or bulk following installation. That is, it is desirable to eliminate or remove all additional weight and bulk from a fastening nut if it is used in an environment where minimum weight is essential. Thus, the usual mass which is present on a fastening nut for the purpose of enabling a fastening tool such as a wrench or the like to properly grip the nut and install the fastener becomes excess following the installation.

In view of the foregoing, it has been desirable to provide a fastening nut which, when properly installed on a fastening bolt, would be little more than a sleeve which is urged against a workpiece to provide the desired tension in the bolt body. In view of the foregoing, it is an object of the present invention to provide a fastening nut which, at the completion of installation thereof, separates into several pieces, one of which is removable.

Another object of the present invention is to provide a fastening nut as characterized above, which is provided with predetermined cuts in the portion interconnecting the grip member and the threaded sleeve to rupture thereat upon application of predetermined torque across such interconnecting means.

A still further object of the present invention is to provide a fastening nut as characterized above, wherein the cuts are formed in the nut by use of a laser, such that the cuts are extremely accurate and precise so that the separation into several parts occurs within a predetermined narrow range of torque.

Another even still further object of the present invention is to provide a fastening nut as characterized above, wherein, upon the occurrence of such predetermined torque, a part removed from the sleeve acts as a lock nut or jam nut to be threadedly urged against the sleeve.

An even still further object of the present invention is to provide a fastening nut as characterized above, wherein there is provided means for enabling the sleeve and jam nut to develop maximum frictional engagement therebetween.

Another further object of the present invention is to provide a fastening nut as characterized above, wherein the grip member is substantially automatically removed from the jam nut following driving thereof onto the sleeve.

A still further object of the present invention is to provide a fastening nut as characterized above, which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 1 is a perspective view of a first embodiment of the present invention;

FIG. 2 is a bottom plan view of the nut constituting the first embodiment as shown in FIG. 1;

FIG. 3 is a sectional view taken substantially along line 3—3 of FIG. 2;

FIG. 4 is an exploded sectional view showing the grip member separated from the sleeve of the nut of FIG. 1;

FIG. 5 is a fragmentary perspective view of a second embodiment of the present invention;

FIG. 6 is a bottom end view of the nut of FIG. 5;

FIG. 7 is a longitudinal sectional view taken substantially along line 7—7 of FIG. 6;

FIG. 8 is a similar longitudinal sectional view showing the relative positions of the sleeve and jam nut following installation;

FIG. 9 is a series of fragmentary views showing interaction of the sleeve and jam not during installation; and FIG. 10 is a perspective view of the fastening nut of FIG. 5 showing the relative position of parts following installation.

Like reference characters indicate corresponding parts throughout the several views of the drawings.

Referring to FIG. 1 of the drawings, there is shown therein a first embodiment 20 of the present invention. It comprises a sleeve 22 which is generally cylindrical in construction and extends the entire length of the nut as shown in FIG. 3, and a grip member 24, there being interconnecting means 26 for connecting the grip member to the sleeve as shown most particularly in FIG. 3.

Sleeve 22 is formed with internal fastening threads 22a, and is made of any appropriate material such as steel, aluminum or any appropriate alloys thereof.

The grip member 24, shown on the drawings, is formed with a hexagonal exterior gripping surface, as shown at 24a, having six flat surfaces for appropriate gripping by a suitable wrench (not shown). Thus, although the hexagonal grip member 24 is actually spaced radially outwardly from sleeve 22, it is connected thereto by the interconnecting web or means 26.

As shown most particularly in FIG. 3 of the drawings, the interconnecting means is provided with six equiangularly spaced arcuate laser cuts 28 which together follow a circular path to leave connecting sections 30 therebetween.

The thickness of the interconnecting means 26, as shown in FIG. 3, as well as the number and length of the connecting sections 30, determine the amount of shear force necessary to separate the grip member 24 from the sleeve 22, as will hereinafter be explained. As also will be understood by those persons skilled in the art, the shear strength of the material of which the composite nut 20 is formed is also a determining factor as to how much torque is created on grip member 24 before the predetermined minimum tightening torque is provided in sleeve 22.

When it is desired to use the nut 20, which constitutes the first embodiment of the instant invention, it is merely necessary to thread the nut onto an appropriate bolt or threaded stud until the flat end surface 22b thereof engages a suitable work piece. Thereafter, continuation of the tightening torque to the grip member 24 causes such torque to be transmitted to sleeve 22 through interconnecting means or web 26. Ultimately, the predetermined tension in the fastening bolt and the corresponding amount of shear force is developed in the solid sections 30 between the spaced laser cuts 28 whereupon further torquing of grip member 24 causes the grip portion to be sheared away from the sleeve, as shown in FIG. 4 of the drawings. At this point the weight and bulk of the grip member 24 is removed and the sleeve remains tightened in place with the requisite tightening torque.

Referring to FIG. 5 of the drawings, there is shown therein a second embodiment 40 of the present invention. In this embodiment, a unitary structure is provided having a cylindrical sleeve 42, one end 42a of the central bore of which is counterbored as at 42b, and internal fastening threads 42c are provided.

Fastening nut 40 further includes interconnecting means 44 and a grip member 46, all of which are formed integrally to provide a unitary structure.

As shown most particularly in FIG. 7 of the drawings, the threads 42c are continuous and extend throughout the length of sleeve 42 as well as the length of interconnecting means 44.

Means 44 is formed with a series of laser cuts 44a which are generally contiguously arranged within a plane generally perpendicular to the longitudinal axis of the nut 40. The laser cuts 44a are spaced apart a predetermined distance at their adjacent ends in accordance with the amount of torque to be developed before the nut is sheared along such plane, as will hereinafter become more apparent. The solid portions 44b between adjacent laser cuts 44a, together with the metallurgy of the material of which the nut 40 is formed, determine the amount of tension to be developed in the bolt (not shown) and hence the maximum amount of pressure to be developed by the sleeve 42 against the work piece.

On opposite sides of the solid or uncut portions 44b are relief laser cuts 44c, each of which is of predetermined width and of such length as to be longer than the length of the corresponding solid portion 44b, for reasons which will be explained in greater detail.

Also provided in the nut 40 is a series of laser cuts 47 which are arranged in a circular fashion as shown, such cuts being spaced from each other to provide a solid portion 47a therebetween as shown in FIGS. 5, 6 and 10 of the drawings. Each laser cut 46 extends through the material as shown most particularly in FIG. 10 of the drawings.

When it is desired to use the nut 40, it is merely necessary to threadedly turn the nut onto an appropriate bolt or threaded stud until the flat end surface 42d of sleeve 42 rests against the work piece. Thereafter, an appropriate torqing tool (not shown) is operatively placed on the grip member 46 and the entire nut 40 is threadedly turned on the bolt or stud, thus increasing the pressure on the work piece. In this regard, all of the internal threads 42c are threaded onto the bolt, a portion of the latter extending beyond the grip member 46.

As is well understood, as the tightening or threading process continues, greater resistance is offered by the work piece, thereby increasing the tension in the bolt. When the desired tension is reached, as defined by the corresponding torque applied to grip means 46, the solid portions 44b between adjacent laser cuts 44a shear, separating the sleeve 42 from the interconnecting portion or jam nut 50. This obtains because in the design and construction of the nut 40, the nut is caused to be weakest under shear loads along the plane wherein the laser cuts 44a exist.

When such shearing action occurs, the grip member 46 is continued to be driven by the setting tool or torquing wrench until the threaded jam nut 50 is forced against the end of sleeve 42.

Referring to FIG. 9 of the drawings, there is shown therein four sequential views of the events that take place upon shearing of jam nut 50 from sleeve 42. The lefthand view therein shows the conditions immediately prior to shearing, namely the sleeve 42 is connected to the interconnecting means 44 by solid material 44b between laser cuts 44a. The second sequential figure shows the solid material 44b having been sheared providing shear surfaces 44d with the interconnecting means 44 rotating on the bolt relative to sleeve 42.

The third sequential view shows the interconnecting portion 44 having more sufficiently to cause the shear surfaces 44d on either side of the shear plane to engage the side walls or surfaces 44e of the adjacent laser cuts. When this occurs, friction builds up between the sleeve 42 and interconnecting means 44, but the continuing torque moves the latter even farther toward the former.

As such action continues, the extended portion adjacent the shear surfaces 44d are pushed in an axial direction, thereby closing the relief laser cuts 44c and effectively causing the corresponding shear surfaces 44d to assume a coplanar relationship with the contiguous side walls of adjacent laser cuts. At this time, each of the exposed surfaces of sleeve 42 and interconnecting means 44 is coplanar so that further torquing of the grip member 46 causes such coplanar surfaces to be driven together in firm and complete frictional engagement. That is, the entire exposed surfaces at this time are caused to engage or abut each other so as to provide a firm frictional engagement therebetween.

Thereafter, continuing torquing of the grip member 46 causes sufficient shear forces to be developed in the solid material 47a between the laser cuts 47 so that the grip member 46 is sheared away from the interconnecting means 44, as shown most particularly in FIG. 10 of the drawings. Thus, the resulting fastening device is reduced to minimum weight by the removal of all excess material.

It is thus seen that the present invention provides a unique structure for firmly securing a nut in place on a threaded bolt or stud and for removing all the excess weight and bulk when properly installed. Also, this invention teaches the provision of a lock nut or jam nut whereby the fastening sleeve is firmly secured in place but only after the proper amount of tension has been created in the bolt or stud on which the nut is mounted.

Although I have shown and described certain specific embodiments of my invention, I am well aware that many modifications thereof are possible. The invention, therefore, is not to be restricted except insofar as is necessitated by the prior art and by the spirit of the appended claims.

I claim:

1. A nut for use with a bolt in making connection with one or more workpieces, comprising in combination,
    a generally cylindrical sleeve formed with internal fastening threads,
    a grip member formed with means to be gripped by a tool,
    means formed with internal fastening threads and interconnecting said sleeve and said grip means whereby torque is transmitted from said tool to said sleeve through said grip member, and control means comprising laser cuts in said interconnecting means along a plane perpendicular to the axis of said sleeve and including relief on opposite sides of said plane in close proximity to each of the shear sections between said laser cuts to enable the shear section adjacent each shear surface following shearing to be recessed into said sleeve and inner connecting means respectively, whereby oppositely disposed side surfaces of said laser cut surfaces are urged into abutting engagement by said torque.

2. A nut for use with a bolt in making connection with one or more work pieces according to claim 1 wherein said relief on opposite sides of each shear section is a space for receiving the adjacent shear section following shearing.

3. A nut for use with a bolt in making connection with one or more work pieces according to claim 2 wherein said space is an opening of predetermined size formed by a laser.

4. A nut for use with a bolt in making connection with one or more work pieces according to claim 3 wherein a second control means is provided between said shear plane and said grip member to separate the latter from said interconnecting means.

5. A nut for use with a bolt in making connection with one or more work pieces according to claim 4 wherein said second control means is operable to effect said separation but only at a predetermined torque which is transmitted from said grip member to said interconnecting means and which is greater than the torque necessary to separate said interconnecting means from said sleeve and drive the side surfaces of said laser cut surfaces together with a predetermined force.

6. A nut for use with a bolt in making connection with one or more work pieces according to claim 5 wherein said second control means is two or more cuts formed intermediate said grip member and said interconnecting means with a laser.

7. A nut for use with a bolt in making connection with one or more workpieces, comprising in combination, a generally cylindrical sleeve formed with internal fastening threads, a grip member formed with means to be gripped by a tool, means interconnecting said sleeve and said grip means formed with internal fastening threads continuous with the threads on said sleeve and having a plurality of circumferentially-spaced cuts thereabout forming a shear section along a plane perpendicular to the axis of said sleeve, and relief means associated with the solid portion at said shear section to permit such solid portion to be recessed on opposite sides of said shear plane following shearing to provide substantially coplanar surfaces thereat during abutting engagement.

8. A nut for use with a bolt in making connection with one or more workpieces according to claim 7 wherein said shear surfaces are driven by torque from said grip member into engagement with side surfaces of said cuts.

9. A nut for use with a bolt in making connection with one or more work pieces according to claim 10 wherein said cuts are precise and are formed by a laser.

10. A nut for use with a bolt in making connection with one or more workpieces according to claim 9 wherein said relief means is on opposite sides of said plane in close proximity to each of said solid portions to enable each shear surface following shearing to be recessed into said sleeve and interconnecting means respectively, whereby oppositely disposed laser cut surfaces are urged into abutting engagement by said torque.

11. A nut for use with a bolt in making connection with one or more workpieces according to claim 10 wherein said relief means on said opposite sides of each solid portion is a space for receiving the adjacent solid portion following shearing.

12. A nut for use with a bolt in making connection with one or more workpieces according to claim 11 wherein said space is an opening of predetermined size formed by a laser.

* * * * *